Patented Feb. 27, 1951

2,543,358

UNITED STATES PATENT OFFICE 2,543,358

RESOLUTION OF N-FORMYL-DL-PENICILLAMINE

Vincent du Vigneaud, Scarsdale, and Robert W. Holley, New York, N. Y.; dedicated to the People of the United States of America No Drawing. Application August 23, 1945, Serial No. 612,317

4 Claims. (Cl. 260—236)

This invention relates to a process for the resolution of derivatives of penicillamine. More particularly, this invention relates to a process for the separation of the optical isomers of penicillamine and certain derivatives thereof.

Penicillamine is useful in the chemical synthesis of certain compounds that are related to penicillin as disclosed in the co-pending application of Vincent du Vigneaud, George B. Brown and John L. Wood, Serial No. 612,318, (case E), filed August 23, 1945, now abandoned. Penicillamine is the trivial name for $\alpha$-amino-$\beta$-thiolisovaleric acid and is a compound which may be formed by the degradation of penicillin. It is known that the penicillamine formed by such degradation is the optically active d isomer. In the chemical synthesis of penicillamine or derivatives or analogues thereof, for example by the process disclosed in the co-pending application of Vincent du Vigneaud, George B. Brown and John L. Wood, Serial 612,315 (case A), filed August 23, 1945, now abandoned, a racemic mixture of the d and l isomers is formed. In the synthesis of certain compounds related to penicillin it is desired that the d isomer of penicillamine be employed. Accordingly, it is an object of this inventon to provide a process for the separation of the optical isomers of penicillamine and its derivatives.

A further object of this invention is the provision of a process for the separation of the optical isomers of compounds related to penicillamine by a series of steps involving the formation of the brucine salt.

A still further object of this invention is the provision of a combination process for the resolution of penicillamine and its derivatives whereby the d and l isomers may be separately isolated in a substantially pure state.

An additional object of this invention is the provision of a process for the resolution of penicillamine and its derivatives involving the successive crystallization of the brucine salts of different derivatives of the penicillamine being treated, whereby an optically active derivative is prepared in one crystallization step and another optically active derivative having the opposite configuration is prepared in a second crystallization step.

Further and additional objects will appear from the following description and the appended claims.

In accordance with one embodiment of this invention, the optical isomers of penicillamine or its derivatives may be separated by a plurality of steps which involve the treatment of a solution of a racemic mixture of the N-formyl-S-benzyl derivative of penicillamine with brucine to form the brucine salts thereof, selectively crystallizing the brucine salt of the l isomer of the derivative treated and subsequently treating the crystalline product in any desired manner to form the pure l isomer or any of its derivatives. The uncrystallized residue containing the d isomer then may be converted by a suitable procedure to a mixture containing the d isomer of the N-formyl derivative of penicillamine. This N-formyl derivative may then be treated with brucine to crystallize the brucine salt of the d isomer which may then be separated from any impurities that may be present and further converted to the pure d isomer of penicillamine or any desired derivative.

An important feature of this invention resides in the steps of separately crystallizing the l isomer of N-formyl-S-benzyl penicillamine as the brucine salt and thereafter selectively crystallizing the d isomer of N-formyl pencillamine as the brucine salt.

In accordance with one embodiment, the combination process of this invention may be summarized as involving the following steps:

(1) Treating a solution of N-formyl-S-benzyl-dl-penicillamine with brucine to form the brucine salt thereof, (2) selectively crystallizing the brucine salt of N-formyl - S - benzyl - l - penicillamine from the solution, (3) separating the crystals from the mother liquor, which liquor contains substantial amounts of the more soluble brucine salt of N-formyl-S-benzyl-d-penicillamine, (4) dissolving the crystals separated in step (3) and removing the brucine therefrom to form N-formyl - S - benzyl - l - penicillamine, (5) subjecting said last-mentioned compound to acid hydrolysis and reduction to form l-penicillamine, (6) removing the brucine from the brucine salt dissolved in the mother liquor of step (3) to form a solution containing N - formyl - S - benzyl - d - penicillamine, (7) evaporating the last-mentioned solution to dryness, (8) reducing the residue directly with an alkali metal in liquid ammonia to form N-formyl-d-penicillamine, (9) separating said last-mentioned compound from any l isomer that may be present as an impurity by crystallization of the brucine salt of the d isomer, and (10) hydrolyzing the crystallized and separated d isomer with a mineral acid to form the corresponding salt of d-penicillamine.

An important feature of this invention is the combination process above indicated for the separation of the d and l isomers of penicillamine from a racemic mixture. Another important feature of the present invention resides in that portion of the process indicated in the steps 1, 3, 6, 8 and 9 supra. By this particular series of steps it will be seen that the desired d isomer may be prepared in substantially pure form by treating the racemic N-formyl-S-benzyl derivative with brucine selectively to crystallize a major proportion of the l isomer, converting the residue to the N-formyl derivative which may then be treated with brucine whereby the brucine salt of the d isomer is crystallized and obtained in a substantially pure state.

For a more complete understanding of this invention reference will now be made to the following general statement of a resolution process embodying this invention.

In accordance with the present invention, the starting material employed is S-benzyl-dl-penicillamine, which is obtained in accordance with the above referred to Du Vigneaud et al. application, Serial No. 612,315. This compound is obtained in accordance with the said application by reacting valine and chloroacetyl chloride, treating the reaction product with acetic anhydride to form 2-methyl-4-isopropylidine-5(4)-oxazolone and treating this oxazolone with an alkali metal alcoholate and benzyl mercaptan.

In accordance with the present invention, the S-benzyl-dl-penicillamine obtained by the indicated procedure of the aforesaid Du Vigneaud et al. application, Serial No. 612,315 (case A), is converted by any suitable procedure to the corresponding N-formyl derivative [α-(N-formyl) amino-β-(S-benzyl) thioisovaleric acid]. This compound in alcoholic solution is treated with brucine and the brucine salt of the l isomer of the derivative is selectively crystallized and filtered from the mother liquor. The mother liquor is set aside for the isolation of a derivative of the d isomer as hereinafter described. The crystals of the l isomer of the derivative are dissolved in chloroform and extracted with ammonium hydroxide and the chloroform layer is discarded. The ammonium hydroxide layer may be clarified, concentrated and is then treated with excess hydrochloric acid. The solution is heated to hydrolyze the N-formyl group, concentrated, and the S-benzyl-l-penicillamine is precipitated. The S-benzyl-l-penicillamine may be further purified, and is then dried and treated with an alkali metal in liquid ammonia to remove the S-benzyl grouping to form free l-penicillamine. The l-penicillamine may, if desired, be converted to certain of its derivatives, subjected to a racemization treatment, and again resolved whereby to obtain additional amounts of the d isomer. The mother liquor from the original brucine treatment step is evaporated to dryness, dissolved in chloroform, and the chloroform solution is extracted with ammonium hydroxide to produce an ammonium hydroxide solution containing S-benzyl-N-formyl-d-penicillamine in the impure state. The solution is evaporated to dryness and reduced with sodium in liquid ammonia whereby to form N-formyl-d-penicillamine. Excess sodium may be removed by the addition of ammonium chloride to the liquid ammonia solution. The ammonia is evaporated off and the residue is dissolved in water which may be further purified by ether extraction. The aqueous solution is cooled and acidified to precipitate the N-formyl-d-penicillamine and its optical isomer which may be present as an impurity. The precipitate is again dissolved in alcohol and treated with brucine. This time the brucine salt of the d isomer crystallizes leaving in solution any l isomer that may be present. The separated crystals of the brucine salt of N-formyl-d-penicillamine is dissolved in chloroform and extracted with ammonium hydroxide to separate the brucine. The ammonium hydroxide layer is then strongly acidified with hydrochloric acid and heated whereby to remove the N-formyl group and the desired substantially pure d-penicillamine hydrochloride may be separated by crystallization.

For a more complete understanding of this invention reference will now be made to a more detailed specific example wherein the steps indicated above were carried out in order separately to produce the d and l isomers of penicillamine from S-benzyl-N-formyl-dl-penicillamine. It will, of course, be apparent to one skilled in the art that many modifications may be made without departing from the spirit and scope of this invention.

*Preparation of N-formyl-S-benzyl-dl-penicillamine*

One hundred thirty-two gm. of S-benzyl-dl-penicillamine prepared in accordance with the process disclosed in the co-pending Du Vigneaud et al. patent application, Serial No. 612,315, (case A) was placed in a 3-l. flask equipped with a mercury-sealed stirrer, a dropping funnel and a thermometer and protected by a calcium chloride tube. Sixteen hundred gm. of 90 percent formic acid were added and the stirrer was started. The solution was warmed on the water bath at 55 to 60° C. The flask was then removed from the bath and 450 gm. of acetic anhydride were added dropwise from the funnel at a rate sufficient to maintain the temperature between 55–60° C. When addition was complete, the solution was returned to the water bath and maintained at 55–60° C. for one hour. Three hundred and eighty cubic centimeters of distilled water were added to the solution. The mixture was concentrated to dryness in vacuo at a bath temperature not exceeding 50° C. Four hundred cubic centimeters of benzene were added. The mixture was again concentrated to dryness in vacuo on the bath at 50° C. The process was repeated until the odor of formic acid was no longer present, two to four times usually being sufficient.

The crystalline residue was extracted with 1 l. of boiling acetone and any unformylated starting material was collected by filtration. The recovered material was washed with water to remove possible ammonium chloride contamination and was dried and recycled in the procedure.

The acetone solution was concentrated under partial vacuum to a volume of 400 cc. Eight hundred cubic centimeters of benzene were added, and the mixture was allowed to stand at 0–5° C. overnight. The crystalline N-formyl-S-benzyl-dl-penicillamine was removed by filtration and was washed with 100 cc. of benzene. The wash and mother liquors were combined and concentrated until precipitation took place (100–200 cc.). Then two volumes of benzene were added and the mixture cooled. In this manner second and third crops of formyl derivative were obtained. The material melted within the range of 149–159° C. and was suitable for resolution with brucine.

The total yield of N-formyl-S-benzyl-dl-penicillamine from this process may be 115–135 gm.

(80–94 percent of the theoretical amount based on the S-benzyl-dl-penicillamine).

*The brucine salt of S-benzyl-N-formyl-penicillamine from S-benzyl-N-formyl-dl-penicillamine*

A warm solution of 370 gm. of anhydrous brucine in 1 l. of methanol was added to a solution of 250 gm. of S-benzyl-N-formyl-dl-penicillamine in 1 l. of warm methanol. The resulting clear solution was cooled in the refrigerator for 18 hours and the crystals of the l isomer which were deposited were collected by filtration and dried. A yield of 235 gm. of the brucine salt of S-benzyl-N-formyl-l-penicillamine was obtained. It has a rotation of $(a)_D^{22}=-9°$ [c=2 (where c is grams per 100 cc. of solution), 50 percent ethanol]. The mother liquors, which contain the optically impure brucine salt of S-benzyl-N-formyl-d-penicillamine were retained for the isolation of the pure d isomer.

*Preparation of S-benzyl-l-penicillamine*

A solution of 285 gm. of the brucine salt of S-benzyl-N-formyl-l-penicillamine in 1 l. of chloroform was shaken with 2 l. of 1 N ammonium hydroxide. The chloroform was separated and the ammonia solution was extracted with three small portions of chloroform. The combined chloroform extracts were washed twice with 250 cc. portions of ammonia solution. The ammonia solutions were combined, clarified by filtration and concentrated in vacuo to a volume of about 1500 cc. The solution, which was then added to litmus, was made 1 N by the addition of concentrated hydrochloric acid.

The acid solution was refluxed for 1.5 hours and then concentrated in vacuo until about 300 cc. of distillate had been removed. Crystallization began to occur and the solution was then cooled. The S-benzyl-l-penicillamine hydrochloride monohydrate was collected. After drying at 60° C. it weighed 100.5 gm., $(a)_D^{22}=+75°$ (c=1, 1 N hydrochloric acid). Further concentration of the mother liquors to 400 cc. yielded a second crop of crystals which weighed 21 gm., $(a)_D^{22}=+42°$. This optically impure fraction may be converted to the dl isomer by racemization, as disclosed in the co-pending application of Vincent du Vigneaud, John L. Wood and Robert W. Holley, Serial No. 612,316 (case C), filed August 23, 1945, now abandoned, and recycled in the resolution procedure.

The first crop of S-benzyl-l-penicillamine hydrochloride monohydrate (100.5 gm.) was dissolved in six volumes of 80 percent ethanol and the pH was adjusted to 6 by the addition of ammonia. The solution was allowed to stand at room temperature for 30 minutes. It was then heated to boiling, filtered rapidly, and the insoluble material was washed with 50 cc. of hot 80 percent ethanol. This insoluble material, S-benzyl-dl-penicillamine, weighed 1.2 gm.

The filtrate was kept at 0–5° C. for 12 hours and then filtered. The crystalline product, S-benzyl-l-penicillamine, weighed 57 gm., $(a)_D^{22}=+85°$ (c=1, 1 N sodium hydroxide solution). Concentration of the mother liquors to dryness gave a residue, $(a)_D^{22}=+40°$. This residue was washed with 120 cc. of water and recrystallized from 80 percent alcohol. An additional 7.2 gm. of product [$(a)_D^{22}=+84°$] was obtained. The total yield of S-benzyl-l-penicillamine suitable for reduction to optically pure l-penicillamine, was 64.8 gm.

*The preparation of l-penicillamine from S-benzyl-l-penicillamine*

S-benzyl-l-penicillamine, $(a)_D^{22}=+85°$ (c=1, 1 N sodium hydroxide) was recrystallized three times from 80 percent ethanol. The resulting material had a rotation of $(a)_D^{22}=+87°$. S-benzyl-l-penicillamine (7.4 gm.) was crushed to a fine powder and reduced in 250 cc. of liquid ammonia by the alternate addition of metallic sodium and S-benzyl-l-penicillamine. The blue color at the end of the reaction was just discharged by the addition of small pieces of solid carbon dioxide. The ammonia was allowed to evaporate at room temperature and finally in a vacuum desiccator over sulfuric acid. After the residue had been cooled thoroughly in a salt-ice bath, 80 cc. of cold 1 N sulfuric acid were added in one portion. The resulting acid solution was adjusted to pH 5–6 by the addition of 0.5 N sodium hydroxide. Then 67 cc. of 1 N sulfuric acid were added. The resulting mixture was extracted with four 100 cc. portions of ether, and the clear aqueous layer was concentrated to dryness in vacuo under nitrogen. The resulting residue was crushed and extracted with 90, 70, and 60 cc. portions of boiling absolute ethanol. The combined alcohol extracts were concentrated in vacuo under nitrogen to 100 cc. The addition of 200 cc. of absolute ether resulted in the formation of a small amount of precipitate which was removed by filtration. The filtrate was concentrated in vacuo under nitrogen to about 25 cc. This syrup was diluted with 100–150 cc. of water, and the sulfate was removed from the hot solution by equilibration with 0.25 N barium hydroxide. The filtrate was concentrated in vacuo under nitrogen to 25 cc., at which volume the last traces of barium sulfate were removed. The resulting solution was concentrated in vacuo under nitrogen and finally concentrated to dryness in a vacuum desiccator over phosphoric anhydride. The l-penicillamine, weighing 4.2 gm. (91 percent of the theory from the S-benzyl-l-penicillamine), melted at 190–194°, and possessed a rotation of $(a)_D^{22}=+63°$ (c=1, 1 N sodium hydroxide).

*The reduction of S-benzyl-N-formyl-d-penicillamine to N-formyl-d-penicillamine*

The combined mother liquors and washings from the crystallization of the brucine salt of S-benzyl-N-formyl-l-penicillamine were evaporated in vacuo. The residue was chiefly the brucine salt of S-benzyl-N-formyl-d-penicillamine along with appreciable amounts of the dl isomer. It was dissolved in 800 cc. of chloroform and transferred to a separatory funnel. It was extracted with 600 cc. of 1 N ammonium hydroxide. The ammonia solution was extracted with three 200 cc. portions and one 50 cc. portion of chloroform. The combined chloroform solutions, containing the brucine, were extracted with 200 cc. of 1 N ammonium hydroxide. The ammonia solutions were combined, filtered, and evaporated to dryness in vacuo. The flask and its contents were placed in a vacuum desiccator overnight to remove the last traces of moisture.

A solution of 145 gm. of this dry residue in 1 l. of liquid ammonia was reduced by portionwise addition of 45 gm. of metallic sodium. The end point was indicated by persistence of the dark blue color of sodium in the liquid ammonia. The sodium was neutralized by the slow addition of 125 gm. of ammonium chloride to the liquid ammonia solution. The ammonia was allowed to evaporate overnight. The last traces of ammonia were removed in vacuo, and the residue was dissolved in 400 cc. of water. All subsequent steps were carried out in an atmosphere of nitrogen.

The aqueous solution was extracted with 150 cc. of ether. The water solution was then cooled to 10° C. and acidified to Congo red with cold 6 N hydrochloric acid. Seventy-four gm. of the N-formyl derivative were collected. The water solution was extracted with two 50 cc. portions of ethyl acetate. Evaporation of the ethyl acetate extracts to dryness yielded an additional 3.5 gm. of the N-formyl derivative. The total yield of crude N-formyl-d-penicillamine was 77.5 gm. The rotation of this product was $(a)_D^{22}=+35°$ (c=1, pyridine).

*The brucine salt of N-formyl-d-penicillamine*

The 77.5 gm. of the crude N-formyl-d-penicillamine still containing some N-formyl-dl-penicillamine were dissolved in 770 cc. of warm methanol and added to a warm solution of 170 gm. of anhydrous brucine in 770 cc. of warm methanol and 7.5 cc. of water. The solution was left at 0-5° overnight.

The next day the precipitate was crushed, filtered, and washed with portions of cold methanol totalling 200 cc. The product, dried in a vacuum desiccator, weighed 220 gm. The rotation of this brucine salt was $(a)_D^{22}=-49.5°$ (c=1, pyridine).

The brucine salt was dissolved in 125 cc. of boiling chloroform, 100 cc. of absolute ethanol were added, and the solution was evaporated to 125 cc. Another 100 cc. of absolute ethanol were added and evaporation continued on a hot plate until solid started to separate. The solution was cooled and filtered. The product was washed with 50 cc. of absolute ethanol. The dried product weighed 215 gm. and had a rotation of $(a)_D^{22}=-49°$ (c=1, pyridine).

*The preparation of N-formyl-d-penicillamine from the brucine salt*

A solution of 41.5 gm. of the recrystallized brucine salt of N-formyl-d-penicillamine in 100 cc. of chloroform was shaken with 85 cc. of 1 N ammonium hydroxide. The chloroform was separated and the ammonia solution was extracted with 40 cc. and 25 cc. portions of chloroform. The chloroform solutions were combined and extracted with three 25 cc. portions of 1 N ammonium hydroxide. The ammonia solutions were combined, filtered, cooled to 10° C., and acidified to Congo red with 35 cc. of cold 6 N hydrochloric acid. The formyl derivative (8.4 gm.) which precipitated was collected and washed with cold water. The filtrate was extracted with two 50 cc. portions of ethyl acetate. Evaporation of the combined extracts to dryness gave 1.15 gm. of N-formyl-d-penicillamine. The total yield was 9.55 gm. (84 percent of the theoretical amount from the brucine salt). The rotation was $(a)_D^{22}=+64°$ (c=1, pyridine).

*d-Penicillamine hydrochloride from N-formyl-d-penicillamine*

A solution of 9.5 gm. of N-formyl-d-penicillamine in 65 cc. of 1 N hydrochloric acid was refluxed gently for one hour and then was concentrated to a solid in vacuo in the absence of air. The residue still contained some hydrochloric acid. The residue was dissolved in 20 cc. of absolute ethanol, and 450 cc. of absolute ether were added. The solution was stirred and 3 cc. of concentrated hydrochloric acid were added. The mixture was left in the refrigerator for two hours and then filtered. The solid which separated was collected and was washed with 20 cc. of absolute ether and then dried in a vacuum desiccator. The weight of dry product was 9.5 gm. which represents a yield of 95 percent from the N-formyl-d-penicillamine used. The rotation was $(a)_D^{22}=-56°$ (c=1, 1 N sodium hydroxide solution).

In the foregoing only one specific example has been given illustrating the manner in which the process of this invention may be carried out. However, it will be readily apparent that certain steps in the procedure may be modified. For example, in the disclosed steps of removing the S-benzyl group from the ether derivatives, it will be apparent that any suitable process may be employed. As disclosed, the reaction may be effected by treatment with an alkali metal, such as sodium, in liquid ammonia. Lithium or potassium may also be used. Likewise other methods may be used such as a catalytic reduction with hydrogen or by reacting the S-benzyl ether with hydrogen bromide. A feature of this invention, however, resides in the discovery that the S-benzyl group may be removed with an alkali metal in liquid ammonia from a compound containing an N-formyl group without previously or simultaneously removing the N-formyl group.

While only one specific embodiment of this invention is indicated in the foregoing, it will be apparent that many modifications may be made by one skilled in the art without departing from the spirit and scope thereof. Accordingly, it is intended that this invention be limited only by the breadth of the appended claims.

We claim:

1. The brucine salt of N-formyl-d-penicillamine.

2. The process that comprises reacting N-formyl-dl-penicillamine with brucine to form the brucine salt of N-formyl-d-penicillamine.

3. The process that comprises reacting a mixture of N-formyl-d-penicillamine and N-formyl-l-penicillamine with brucine to form the brucine salt of N-formyl-d-penicillamine.

4. The process that comprises reacting brucine in alcoholic solution with a mixture of N-formyl-d-penicillamine and N-formyl-l-penicillamine to crystallize the brucine salt of N-formyl-d-penicillamine.

VINCENT DU VIGNEAUD.
ROBERT W. HOLLEY.

REFERENCES CITED

The following references are of record in the file of this patent:

Du Vigneaud et al.: J. Biol. Chem., vol. 109, pp. 97-103 (1935).

Karrer: Organic Chemistry, pp. 92-93 (1938).

Wood et al.: J. Biol. Chem., vol. 130, pp. 109-114 (1939).

British Report—Pen. 100—(Oct. 4, 1943) received in New York Jan. 24, 1944, pp. 2, 3 and 4.

Northern Regional Research Laboratory Report C-5, CFS-No. 254, Apr. 10, 1944, pp. 6 and 7.

The Chemistry of Penicillin, Princeton Univ. Press (1949), pp. 462-463 and 1043.